United States Patent
Guchhait (10) Patent No.: US 11,934,885 B2
(45) Date of Patent: Mar. 19, 2024

(54) SYSTEM AND METHOD FOR USE WITH A CLOUD COMPUTING ENVIRONMENT FOR DETERMINING A CLOUD SCORE ASSOCIATED WITH RESOURCE USAGE

(71) Applicant: ORACLE INTERNATIONAL CORPORATION, Redwood Shores, CA (US)

(72) Inventor: Achintya Guchhait, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/153,462

(22) Filed: Jan. 20, 2021

(65) Prior Publication Data
US 2022/0229704 A1 Jul. 21, 2022

(51) Int. Cl.
G06F 9/46 (2006.01)
G06F 9/455 (2018.01)
G06F 9/50 (2006.01)

(52) U.S. Cl.
CPC ........ G06F 9/5072 (2013.01); G06F 9/45558 (2013.01); G06F 9/505 (2013.01);
(Continued)

(58) Field of Classification Search
CPC .... G06F 9/5072; G06F 9/45558; G06F 9/505; G06F 9/5083; G06F 2009/45562; G06F 2009/4557; G06F 2009/45591
(Continued)

(56) References Cited

U.S. PATENT DOCUMENTS 7,827,435 B2 11/2010 Sahoo et al.
8,291,416 B2 10/2012 Cartales
(Continued)

FOREIGN PATENT DOCUMENTS

WO 2017071033 5/2017
WO 2017112324 6/2017

OTHER PUBLICATIONS

Kembhavi, et al., "Fine Tuning of Rank Based VM Placement and Scheduling Strategies on Opennebula Based Cloud", International Journal of Recent Technology and Engineering, Jan. 2020, vol. 8, Issue 5, 3 pages.
(Continued)

*Primary Examiner* — Bradley A Teets
(74) *Attorney, Agent, or Firm* — TUCKER ELLIS LLP (57) ABSTRACT

A system and method for use with a cloud computing environment, for determining a cloud score associated with a resource configuration, limits, or shape, for example that of a virtual machine or host provided within the environment. The described approach provides a set of infrastructure workloads, for use in assessing a cloud infrastructure and resources provided thereby, so that a full spectrum of aspects of the cloud infrastructure can be covered by workload testing. The workloads can be used to generate metrics associated with resource usage. The system can then consider one or more metrics that are associated with performance of a particular resource configuration or shape, for example that of a virtual machine or (e.g., bare metal) host hosted by a cloud provider, and determine a score that is indicative of the relative performance of that configuration or shape for a particular workload configuration.

19 Claims, 8 Drawing Sheets

(52) U.S. Cl.
CPC .. *G06F 9/5083* (2013.01); *G06F 2009/45562* (2013.01); *G06F 2009/4557* (2013.01); *G06F 2009/45591* (2013.01)

(58) Field of Classification Search
USPC .......................................................... 718/105
See application file for complete search history.

(56) References Cited

U.S. PATENT DOCUMENTS

| | | | |
|---|---|---|---|
| 9,069,890 B2 | 6/2015 | Kaiser et al. | |
| 9,262,221 B2 | 2/2016 | Chen et al. | |
| 10,574,550 B2 | 2/2020 | Brewster, Jr. et al. | |
| 11,372,663 B2* | 6/2022 | Featonby | G06F 9/5077 |
| 2012/0137001 A1* | 5/2012 | Ferris | H04W 4/60 |
| | | | 709/226 |
| 2014/0278808 A1* | 9/2014 | Iyoob | G06Q 30/0206 |
| | | | 705/7.35 |
| 2015/0370594 A1 | 12/2015 | Ghosh et al. | |
| 2017/0060720 A1* | 3/2017 | Ramanath | H04L 43/20 |
| 2017/0214632 A1* | 7/2017 | Ravi | H04L 41/5054 |
| 2017/0322827 A1* | 11/2017 | Little | G06F 11/301 |
| 2018/0074855 A1* | 3/2018 | Kambatla | G06F 9/4881 |
| 2019/0243687 A1* | 8/2019 | Chen | G06F 9/455 |
| 2019/0245757 A1* | 8/2019 | Meyer | G06F 8/60 |
| 2020/0249962 A1* | 8/2020 | Vichare | G06F 9/5083 |
| 2021/0042140 A1* | 2/2021 | Paul | G06F 1/3206 |

OTHER PUBLICATIONS

Lubomski, et al., "Multi-level virtualization and its impact on system performance in cloud computing", International Conference on Computer Networks, 2016, pp. 247-259, 13 pages.

Microsoft, "Compute benchmark scores for Windows VMs", Azure Windows Virtual Machines—Microsoft Docs, published Apr. 29, 2020, retrieved from https://docs.microsoft.com/en-us/azure/virtual-machines/windows/compute-benchmark-scores on Aug. 14, 2020, 32 pages.

* cited by examiner

SYSTEM AND METHOD FOR USE WITH A CLOUD COMPUTING ENVIRONMENT FOR DETERMINING A CLOUD SCORE ASSOCIATED WITH RESOURCE USAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally directed to cloud computing environments, and systems and methods for determining a cloud score associated with a resource configuration, limits, or shape, for example that of a virtual machine or host provided within the environment.

BACKGROUND

In a cloud computing environment, there may be many different types of workloads, which target different aspects of the cloud infrastructure. For example, some workloads may target the usage of compute resources, while other workloads may target memory access, and yet other workloads may target network performance or input/output (I/O).

Although lower level workloads may target or stress particular aspects of the cloud infrastructure, higher level workloads or applications may stress a combination of several aspects together. However, typically the performance of such workloads are evaluated or benchmarked using tools and metrics that are specific to their target usage. The use of disparate technologies to assess or categorize various types of workloads or applications makes it difficult to provide a standardized measurement of their usage of cloud infrastructure resources.

SUMMARY

In accordance with an embodiment, described herein is a system and method for use with a cloud computing environment, for determining a cloud score associated with a resource configuration, limits, or shape, for example that of a virtual machine or host provided within the environment. In accordance with an embodiment, the described approach provides a set of infrastructure workloads, for use in assessing a cloud infrastructure and resources provided thereby, so that a full spectrum of aspects of the cloud infrastructure can be covered by workload testing. The workloads can be used to generate metrics associated with resource usage. The system can then consider one or more metrics that are associated with performance of a particular resource configuration or shape, for example that of a virtual machine or (e.g., bare metal) host hosted by a cloud provider, and determine a score that is indicative of the relative performance of that configuration or shape for a particular workload configuration.

DETAILED DESCRIPTION

As described above, in a cloud computing environment, there may be many different types of workloads, which target different aspects of the cloud infrastructure. Although lower level workloads may target or stress particular aspects of the cloud infrastructure, higher level workloads or applications may stress a combination of several aspects together. However, typically the performance of such workloads are evaluated or benchmarked using tools and metrics that are specific to their target usage.

In accordance with an embodiment, to obtain a performance profile of a standard compute configuration or shape offered by a cloud provider, it may be appropriate to consider various infrastructure workloads, the metrics reported by which can be considered separately. Additionally, it may be appropriate to consider the architectural components or shape limits that are part of the platform and which will limit performance. This results in a lot of variables to consider.

Finally, when two profiles are compared with each other, all of the parameters need to be considered, and there is no clear indicator of overall expected performance. The result of such comparison must reflect the parameters from all the workloads that were considered for the profile. So there is a challenge in how to choose the workloads so that the full spectrum is covered.

Another consideration is, if all of the results are not in line, what to conclude from the results. Typically, system/chip providers develop standard workload results mostly concentrating on compute and memory and publish results run on the bare metal hosts. Cloud providers run some workloads that they find relevant on their virtual hosts and have to consider all the results from these workloads individually.

In accordance with an embodiment, described herein is a system and method for use with a cloud computing environment, for determining a cloud score associated with a resource configuration, limits, or shape, for example that of a virtual machine or host provided within the environment.

In accordance with an embodiment, the described approach provides a set of infrastructure workloads, for use in assessing a cloud infrastructure and resources provided thereby, so that a full spectrum of aspects of the cloud infrastructure can be covered by workload testing. The workloads can be used to generate metrics associated with resource usage. The system can then consider one or more metrics that are associated with performance of a particular resource configuration or shape, for example that of a virtual machine or (e.g., bare metal) host hosted by a cloud provider, and determine a score that is indicative of the relative performance of that configuration or shape for a particular workload configuration.

Cloud Computing Environments

Figure 1:
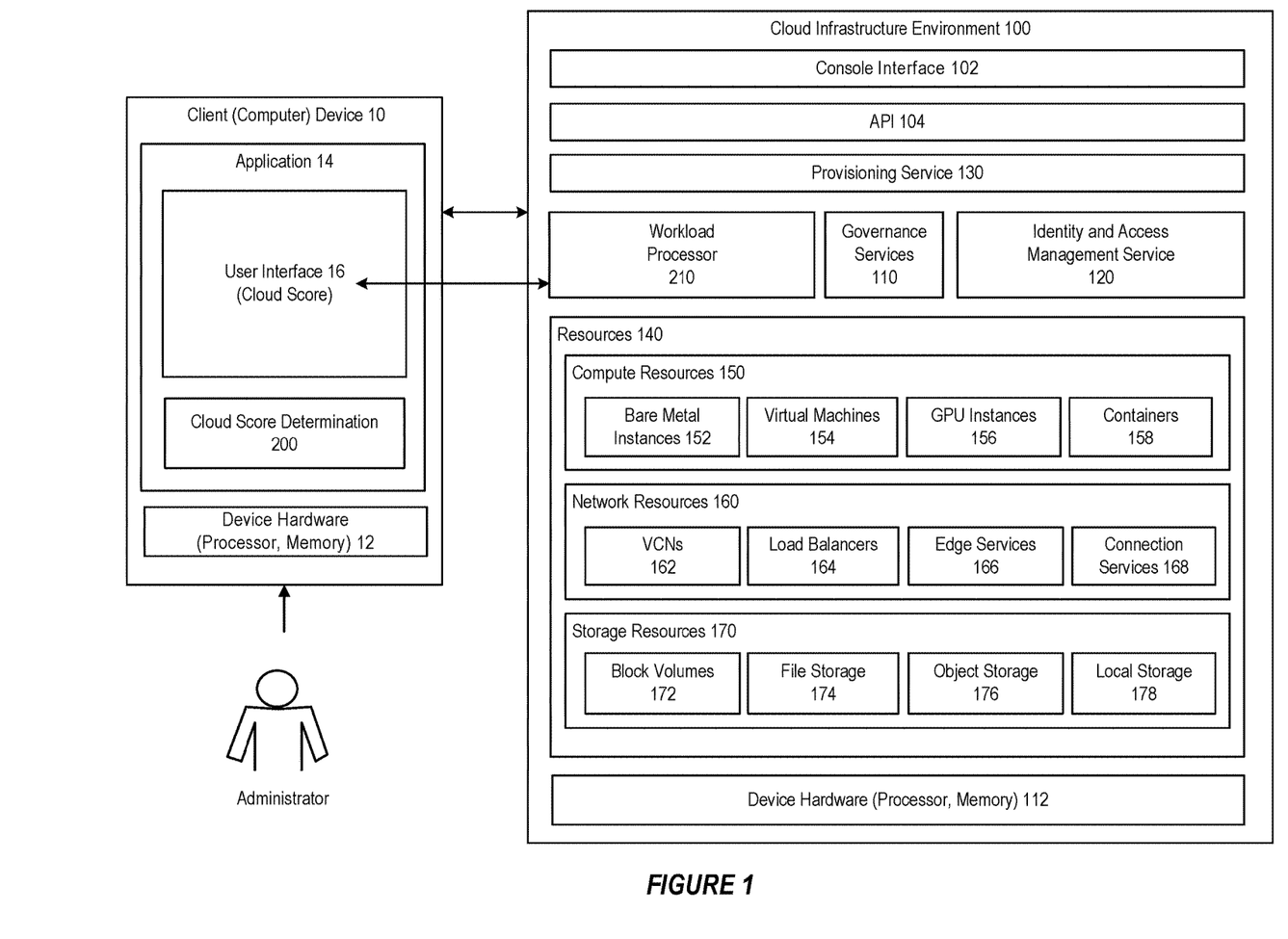
FIG. 1 illustrates an example cloud computing environment and system for determining a cloud score associated with a resource configuration or shape, for example that of a virtual machine or host provided within the environment, in accordance with an embodiment.

FIG. 1 illustrates an example cloud computing environment and system for determining a cloud score associated with a resource configuration or shape within a cloud environment, in accordance with an embodiment.

In accordance with an embodiment, the cloud computing environment (cloud environment) illustrated in FIG. 1 is provided for purposes of illustrating an example of one type of cloud environment that can utilize the systems and methods described herein for automating heterogeneous diagnostic data analysis and expertise. In accordance with other embodiments and examples, the systems and methods described herein can also be used with other types of cloud environments, cloud services, cloud computing, or other computing environments.

In accordance with an embodiment, a cloud infrastructure environment 100, which can be run on a number of hardware and software resources 112, can comprise a console interface 102 and an API 104. In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170. In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an application 14, which can comprise a user interface 16, and as described below can be used to determine and display a cloud score of a virtual machine or host provided within the environment.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the could infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons.

In accordance with an embodiment, the identity and access management (IAM) service 120 can create a user profile for each client/customer/user in the IAM service with associated with user credential (e.g., username and password). Clients can be granted administrator privileges in the cloud infrastructure as well via the IAM service.

In accordance with an embodiment, the identity and access management service can be integrated with the cloud infrastructure environment. Upon a client registering. The IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controlled through, for example, the console interface or via one or more APIs, such as API 104. The provisioning service can allow for clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by an cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, edge services 156, and containers 158. The compute resources layer can be used to, for example, provision and manage bare metal compute instances, provision instances as needed to deploy and run applications, just as in an on-premises data center. In accordance with an embodiment, the cloud infrastructure environment can provide control of one or more physical host ("bare metal") machines within the compute resources layer. Bare metal compute instances run directly on bare metal servers without a hypervisor. When a bare metal compute instance is provisioned, the client can maintain sole control of the physical CPU, memory, and network interface card (NIC). The bare metal compute instance can be configured and utilize the full capabilities of each physical machine as if it were hardware running in an on-premise own data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operation system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure.

In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial HPC applications. GPU compute instances can be provisioned as either virtualized compute instances (where multiple GPU compute instances share the same bare metal hardware), or as bare metal instances which provide dedicate hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168.

In accordance with an embodiment, the cloud infrastructure environment can provide a number of virtual cloud networks 162 at the networking resources layer. A virtual cloud network can comprise a virtual version of a traditional network including subnets, route tables, and gateways on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balances can provide a public or private IP address, and provisioned bandwidth.

In accordance with an embodiment, a load balancer can improved resource utilization, scaling, and help ensure high availability. Multiple load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance transport different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balance can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can creates a primary load balancer and a standby load balancer, each in a different availability domain, to ensure accessibility even during an availability domain outage. If a load balance is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balances can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid state drives for I/O intensive applications. These can be provided, for example, within bare metal instances. Local storage provides high storage performance for VM's and bare metal compute instances. Some examples include relational databases, data warehousing, big data, analytics, AI and HPC application.

In accordance with an embodiment, the various steps, components, or processes described above can be provided as software or program code executable by a computer system or other type of processing device.

Determination of Cloud Scores

In accordance with an embodiment, a cloud score associated with a resource configuration, limits, or shape provided in a cloud computing environment, for example that of a virtual machine or host provided within the environment, can be generated.

In accordance with an embodiment, the described approach provides a set of infrastructure workloads, for use in assessing a cloud infrastructure and resources provided thereby, so that a full spectrum of aspects of the cloud infrastructure can be covered by workload testing. The workloads can be used to generate metrics associated with resource usage. The system can then consider one or more metrics that are associated with performance of a particular resource configuration or shape, for example that of a virtual machine or (e.g., bare metal) host hosted by a cloud provider, and determine a score that is indicative of the relative performance of that configuration or shape for a particular workload configuration.

Figure 2:
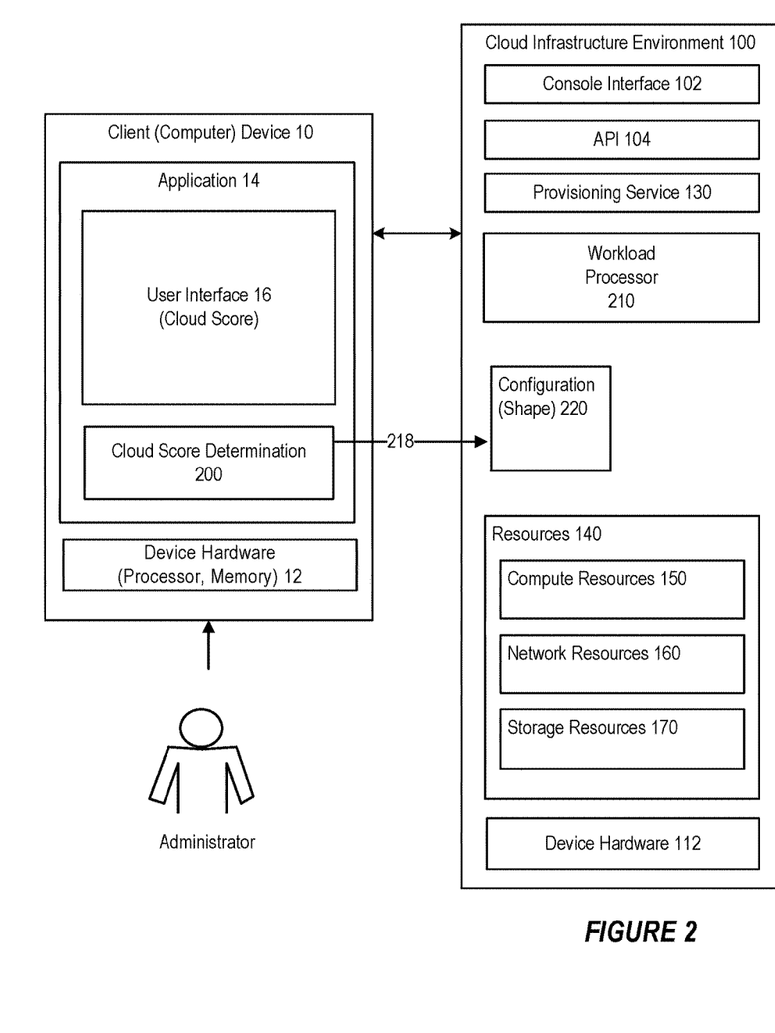
FIG. 2 illustrates a system for determining a cloud score associated with resource usage within a cloud environment, in accordance with an embodiment.

FIG. 2 illustrates a system for determining a cloud score associated with resource usage within a cloud environment, in accordance with an embodiment.

As illustrated in FIG. 2, in accordance with an embodiment, a client device as described above, comprising an application and user interface, can be used to determine and display a cloud score of a virtual machine or host provided within the environment.

In accordance with an embodiment, the application can include a cloud score determination component 200, which operates in combination with a workload processor 210 operating within the cloud environment, to generate a cloud score, for example to be displayed at the user interface, or otherwise reported.

In accordance with an embodiment, a set of infrastructure workloads are used, so that the full spectrum of aspects of the cloud infrastructure can be considered in generating a cloud score that is indicative of the relative performance positioning of a particular configuration or shape. The cloud score can reflect factors such as, for example, static components that are provided as a part of cloud infrastructure/architecture, or limitations that the cloud provider puts on the resource usage. The cloud score can also reflect both the throughput and latency components of any workload, since there may be performance advantages from either.

In accordance with an embodiment, the workload processor can receive an indication 218 of a particular configuration of resources (referred to herein in some embodiments as a shape) 220 for workload testing. For example, a particular configuration may specify a number of bare metal instances or virtual machines, with various performance characteristics; and can be associated with a shape that defines a cloud infrastructure (e.g., Oracle Cloud Infrastructure, OCI) configuration. An example shape may define a number of CPU's associated with a VM; associate memory with the VM. A flexible shape may indicate, e.g., 1-64 CPU's, or other combination of the processor cores and how much memory and how much network bandwidth is associated with the VM. A shape can have some static aspects, such as a number of CPU's or network bandwidth, and/or dynamic aspects. In accordance with an embodiment, the various configurations/shapes can be associated with particular workloads, and workload tests.

Figure 3:
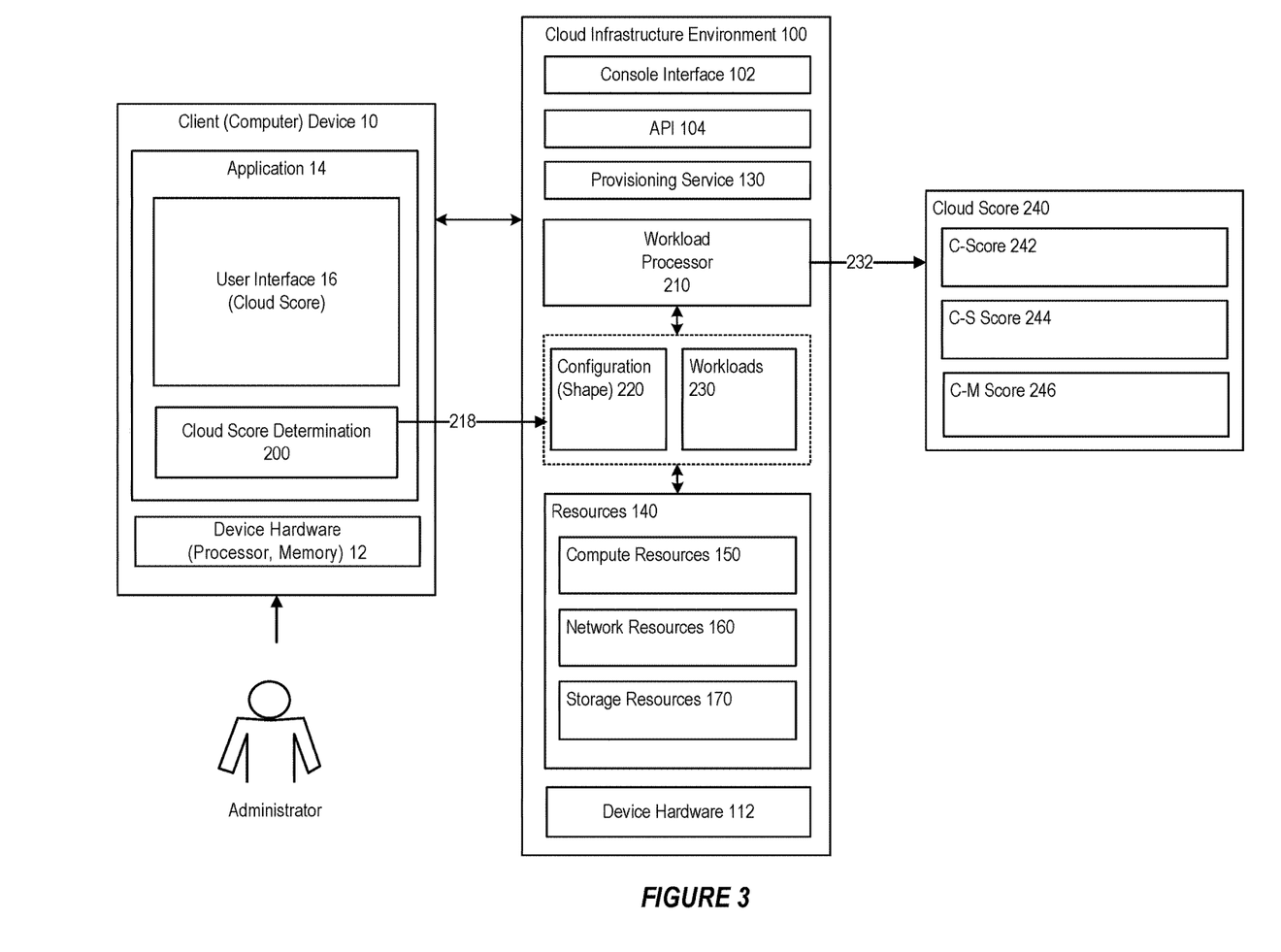
FIG. 3 further illustrates a system for determining a cloud score associated with resource usage within a cloud environment, in accordance with an embodiment.

FIG. 3 further illustrates a system for determining a cloud score associated with resource usage within a cloud environment, in accordance with an embodiment.

As illustrated in FIG. 3, in accordance with an embodiment, when the particular workloads 230 are processed, the workload metrics are used to generate 232 a cloud score 240.

The cloud score can then be used to compare workload processing across different platforms or environments. In one embodiment, the cloud score is 3-fold including for example, an overview score (C-score) 242 over all types of workloads; a single-threaded workload component (C-S Score) 244; and a multi-threaded workload component (C-M Score) 246. Workload tests can be can run at highest throughput and used to calculate a latency component, wherein for example a lower latency can give us a higher cloud score.

In accordance with an embodiment, for each of various networks, configurations, or shapes, the system runs a plurality of different types of workloads, each associated with metrics provided by those workloads, for example by defining workloads, spawn VM's, and then running the workloads.

Figure 4:
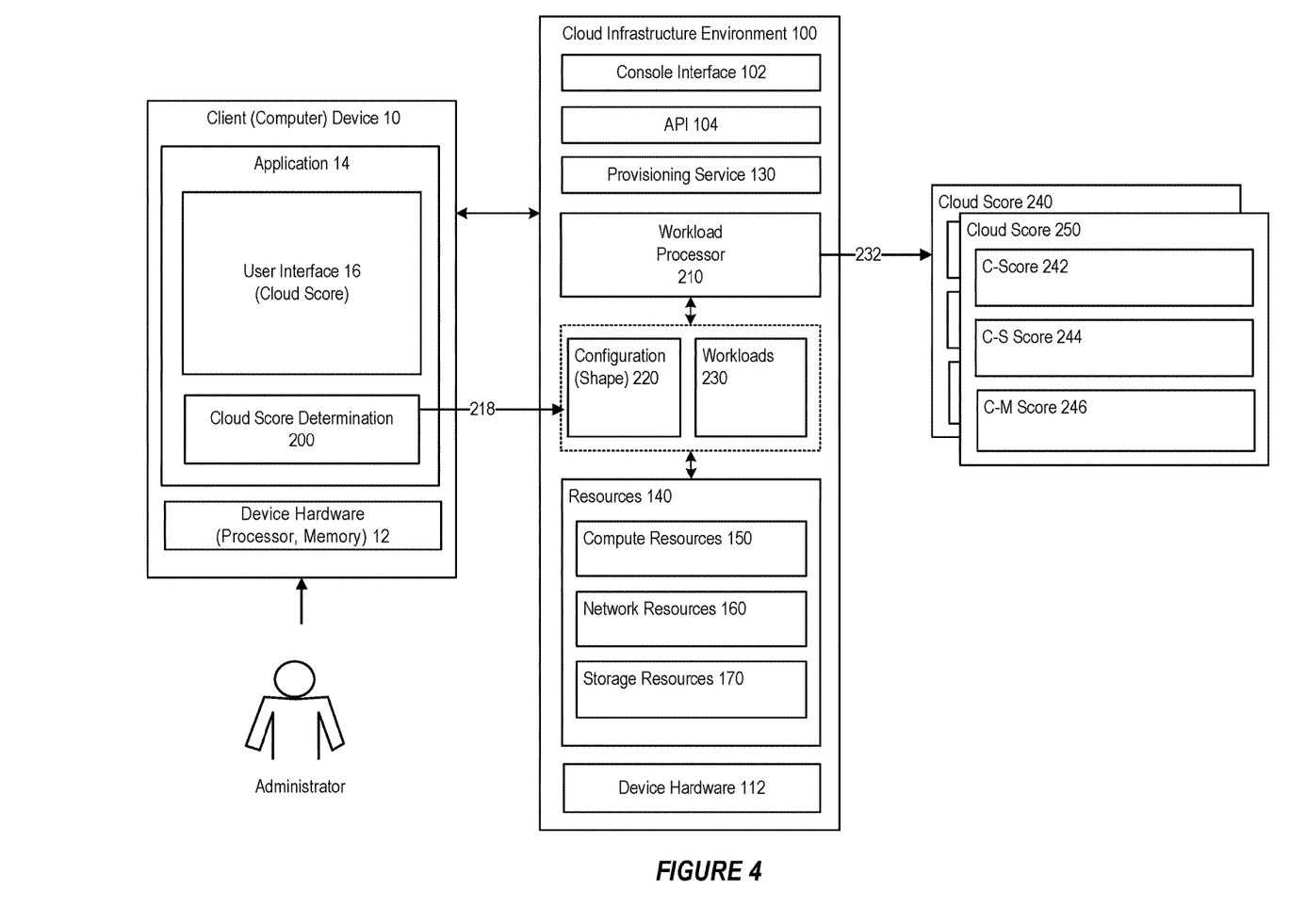
FIG. 4 further illustrates a system for determining a cloud score associated with resource usage within a cloud environment, in accordance with an embodiment.

FIG. 4 further illustrates a system for determining a cloud score associated with resource usage within a cloud environment, in accordance with an embodiment.

As illustrated in FIG. 4, in accordance with an embodiment, the system can perform several runs (250) of workloads; and aggregate information from the runs/workloads, across the VM's in the cloud environment. By combining all the above factors, the system can then generate a cloud score, and sub-scores, for example:

C Score—Overall score of a particular configuration or shape running a particular OS In accordance with an embodiment, the C Score considers everything and is generally self-sufficient. Particular examples of configurations/workloads and metrics used to generate a C Score are described in Tables 1 and 2 and the accompanying description. In accordance with various embodiments, there can also be various sub-scores, for example:

C-S Score—Primarily reflects single-threaded performance
  C-M Score—Primarily reflects multi-threaded performance Since there is no standard cloud score available to compare configurations or shapes from different cloud providers, in accordance with an embodiment the cloud score approach described herein can be used to provide a single point check to perform trending for a particular shape within the same cloud provider's offerings. The cloud scores provide an easy method of comparing performances, for example, on different Unix operating systems for a particular shape of a cloud provider. When throughput and latency components are considered for the cloud scores, the reciprocals of latency components can be used so that the cloud scores are normalized and higher scores indicate better performance.

In accordance with an embodiment, the described approach can significantly reduce the decision making confusion for a cloud provider as to whether a change is good enough from performance point of view. The change could be in cloud architecture/networking or operating system for an existing configuration or shape of any cloud provider. The cloud scores will also help in the decision-making process of introducing new platforms into the infrastructure offerings and also in the chip generation upgrade of the currently supported platforms.

In accordance with an embodiment, examples use cases can include calculating a score for a configuration or shape, modifying the shape, calculating the cloud score again, and determining trends associated with cloud score. For a data center or region including availability domain—that will be a new configuration or shape, and will have a new latency, and so workloads on that new shape (data center) will have a different score. The information can be given to the, e.g., OCI operations team so they can administer the network accordingly.

Figure 5:
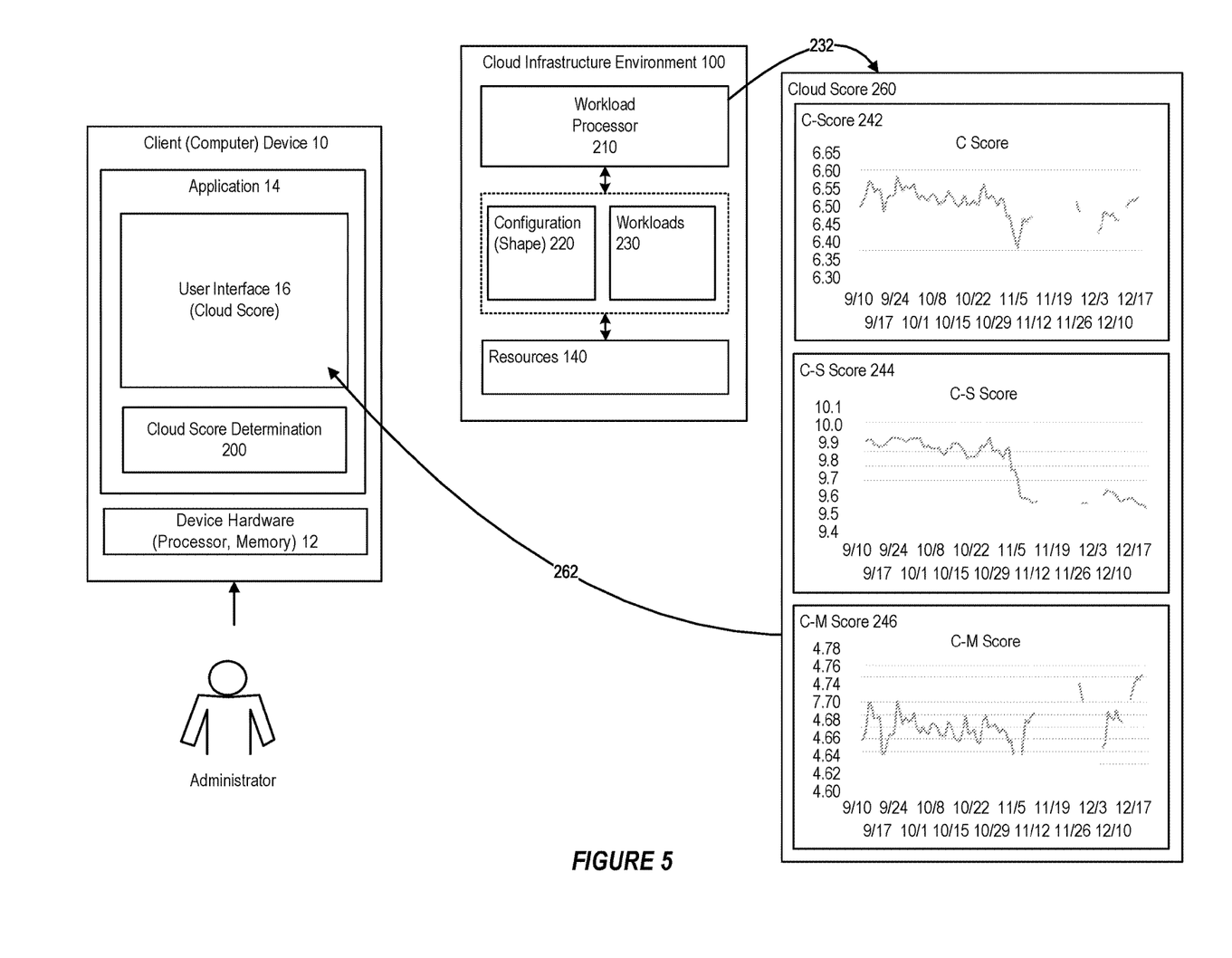
FIG. 5 further illustrates a system for determining a cloud score associated with resource usage within a cloud environment, in accordance with an embodiment.

FIG. 5 further illustrates a system for determining a cloud score associated with resource usage within a cloud environment, in accordance with an embodiment.

As illustrated in FIG. 5, in accordance with an embodiment, display or plot of cloud scores 260, which can be returned 262 to or otherwise displayed at the client device.

For example, in accordance with an embodiment, an, e.g., OCI, environment can include a database for storing the metrics, and providing those metrics and cloud scores as trends over time. When a particular even occurs as determined by a particular cloud score, the system can trigger an alert as to the cloud score.

Figure 6:
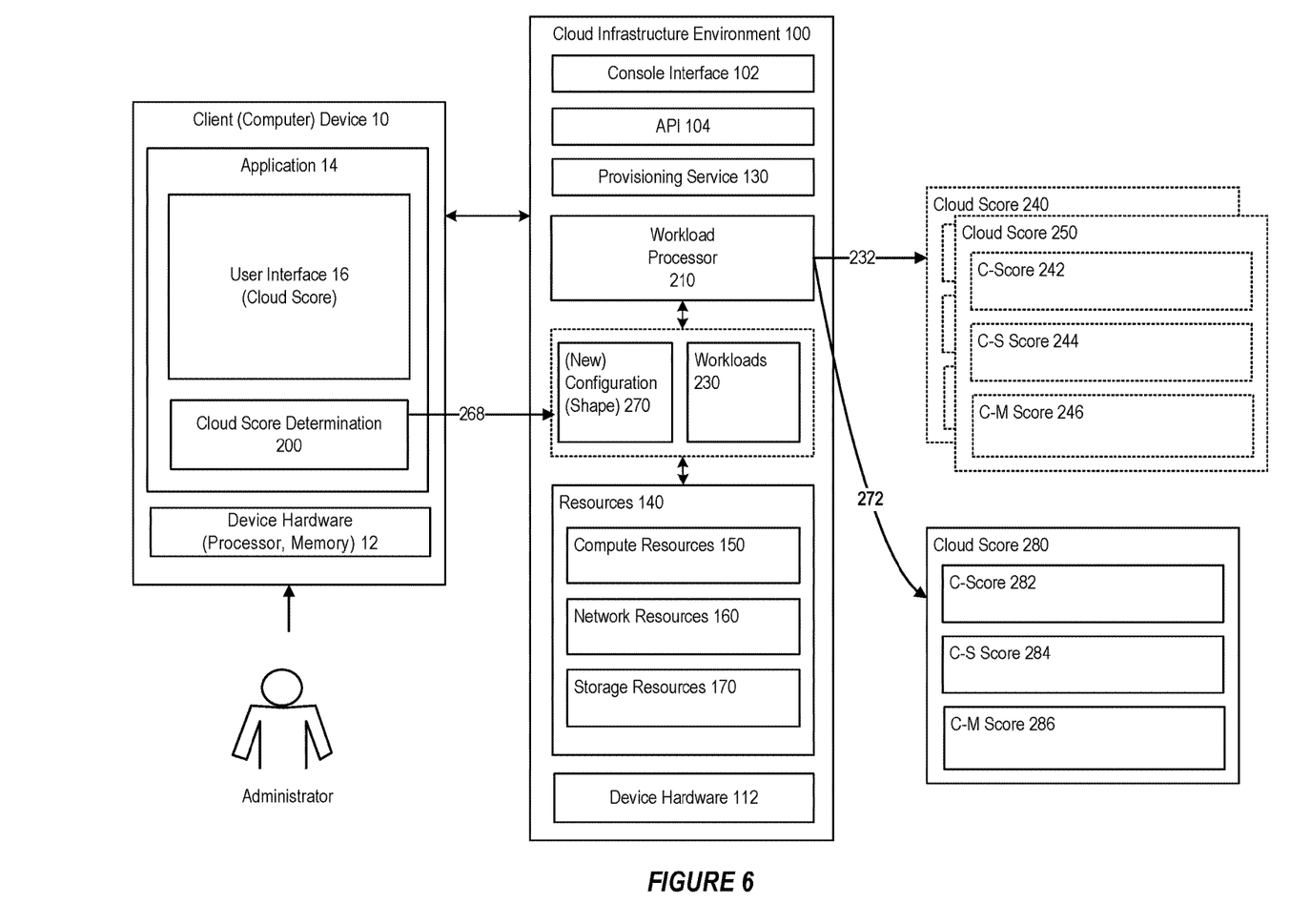
FIG. 6 further illustrates a system for determining a cloud score associated with resource usage within a cloud environment, in accordance with an embodiment.

FIG. 6 further illustrates a system for determining a cloud score associated with resource usage within a cloud environment, in accordance with an embodiment.

As illustrated in FIG. 6, in accordance with an embodiment, an administrator can specify 268 a (new) configuration (shape) 270, and generate appropriate workloads and generate new scores 280, including overview score (C-score) 282; single-threaded workload component (C-S Score) 284; and a multi-threaded workload component (C-M Score) 286.

Figure 7:
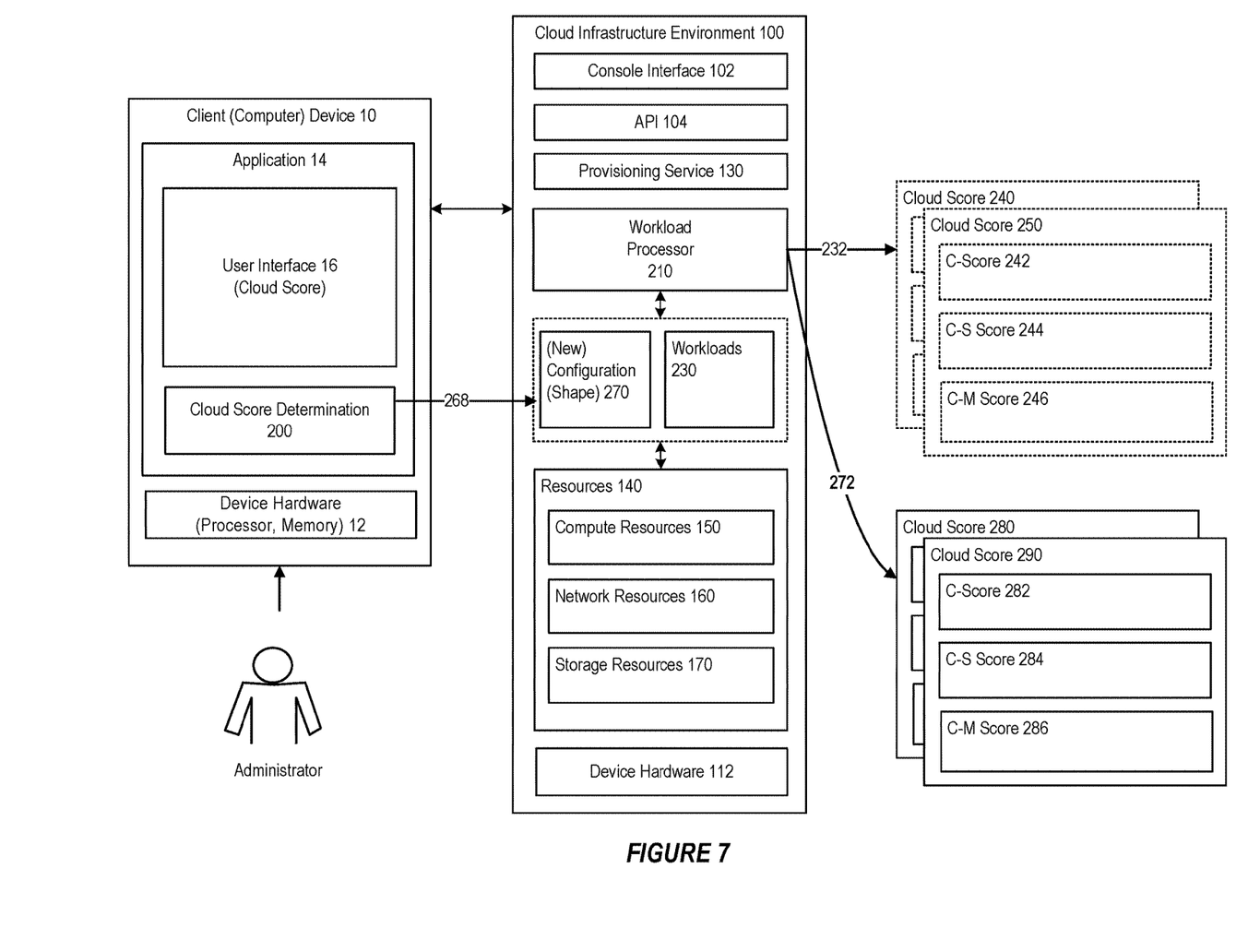
FIG. 7 further illustrates a system for determining a cloud score associated with resource usage within a cloud environment, in accordance with an embodiment.

FIG. 7 further illustrates a system for determining a cloud score associated with resource usage within a cloud environment, in accordance with an embodiment.

As illustrated in FIG. 7, in accordance with an embodiment, the system can similarly over time generate multiple runs (290), for purposes of generating scores. Each cloud score can have a version associated with it, for example, a Cloud score version 1; Cloud score version 2.

In accordance with an embodiment, the identified spectrum of workloads can be run on Oracle Cloud Infrastructure (OCI) and expanded to run on key supported Linux distributions (Oracle Linux, CentOS and Ubuntu). They can be looked at by development teams as performance trends for different workloads.

For example, the system can generate a performance alert based on any significant gain or drop in the workload runs. A drop in performance in one workload combined with a significant gain in performance in another, does not change the cloud scores of a configuration or shape. However, the first level alert of change in cloud scores, significantly helped in reducing the number of performance alerts. The cloud scores are derived from an average of three runs of these workloads, run at different times of day. Looking at one metric alone now, and administrator can decide whether they want to investigate any observations in the cloud scores in further detail.

In accordance with an embodiment, when new processors/platforms are to be considered to be included as part of cloud offering, it becomes very easy with cloud score to position a configuration or shape in the full spectrum of offerings by a cloud provider. This can also be used to choose the processors/platforms based on performance workload study, if there is more than one option to choose from. A price component can be added to cloud score can help in cost analysis of the new platform to be introduced. Based on that, PAAS/SAAS services that use infrastructure can determine the most cost effective performant configurations or shapes, when they are available for their usage.

In accordance with an embodiment, provided below are various examples of details of the workloads that can be run. For example, I/O workloads in cloud environment are considered to be all network traffic. Directly attached storage disks should be separately considered as a value add to the cloud score of a configuration or shape, depending on workloads that can extract the benefits of directly attached high speed storage:

SPEC CPU 2017
HPL (Linpack)
Unixbench
Stream
Cloud Harmony Network Test
Uperf

In accordance with an embodiment, Table 1 illustrates various configurations that the above workloads are run with, in order to determine cloud score.

TABLE 1

SPEC CPU 2017: needs to be run in two modes, one at best throughput mode, the second with only a single thread.
HPL: Best throughput Mode.
Unixbench: Best Throughput Mode.
Stream: Needs to be run in two modes, one at best throughput mode, the second with only a single thread.
Cloud Harmony Network: Network ping test to another same VM shape in the same Availability Domain of the same Cloud region.
Cloud Harmony Network: Network ping test to another same VM shape in different Availability Domains of the same Cloud region.
Uperf: Best Throughput Mode with two same VM shapes in the same Availability Domain of the same Cloud region. As Uperf requires Network profiles to be set by the user. These are the five Network profiles that are needed to generate the Cloud Scores:
Profile 1: Mimicking a video server, ten threads of Uperf per core
Profile 2: Mimicking a OLTP server, four threads of Uperf per core
Profile 3: Mimicking Object Store Access, two threads of Uperf per core
Profile 4: Mimicking a RMAN backup, one thread of Uperf per core
Profile 5: Mimicking iPerf, small packets hitting Network limits, one thread of Uperf per core
Uperf: Best Throughput Mode with two same VM shapes in different Availability Domains of the same Cloud region with the same profiles as above. For all the five Uperf profiles, based on the thread counts, the throughput in Mb/s and the 90th percentile Response Time in usec should be recorded. A Geometric Mean of Throughputs and Response Times separately are to be considered as two different metrics for Score calculation.

In accordance with an embodiment, Table 2 illustrates various metrics that are generated by the workloads/configurations illustrated above, and which form part of the generated cloud score:

TABLE 2

A_FREQ_GHz: Base Frequency in GHz of the processor in use.
A_TURBO_GHz: Turbo/Boost Frequency in GHz of the processor in use.
A_vCPUs: Number of Virtual CPUs/Hardware threads which is part of the shape in use.
A_MemGB: Memory allocated for the shape in use in GB.
A_BWGbps: Network BW Limit of the shape in use as applied by the Cloud provider.
S_Stream_T: Single Threaded Triad Rate, coming from single threaded Stream workload, Average of three runs.
M_Stream_T: Best Throughput Triad Rate, coming from single threaded Stream workload, Average of three runs.
S_SPECCPU_T1: Estimated Spec CPU 2017 Integer Base Rate at Single Threaded mode, Average of three runs.
S_SPECCPU_T2: Estimated Spec CPU 2017 Floating Point Base Rate at Single Threaded mode, Average of three runs.
M_SPECCPU_T1: Estimated Spec CPU 2017 Integer Base TABLE 2-continued Rate at Best Throughput mode, Average of three runs.
M_SPECCPU_T2: Estimated Spec CPU 2017 Floating Point Base Rate at Best Throughput mode, Average of three runs.
M_HPL_T: HPL Linpack Triad Rate run at Best Throughput mode, Average of three runs.
M_HPL_L: Reciprocal of HPL Linpack Triad Run Time run at Best Throughput mode, Average of three runs.
M_Unixbench_T: Unixbench Concurrent Score, Average of three runs.
S_Unixbench_T: Unixbench Serial Score, Average of three runs.
M_Uperf_T: Uperf Throughput (Geometric Mean of five different profiles as defined in Uperf section) in Mb/s generated between two same shaped VMs in the same Availability Domain of the same Cloud Region, Average of three runs.
M_Uperf_L: Reciprocal of Uperf Latency (Geometric Mean of five different profiles as defined in Uperf section) in usec, generated between two same shaped VMs in the same Availability Domain of the same Cloud Region, Average of three runs.
M_Uperf_T2: Uperf Throughput (Geometric Mean of five different profiles as defined in Uperf section) in Mb/s generated between two same shaped VMs in different Availability Domains of the same Cloud Region, Average of three runs.
M_Uperf_L2: Reciprocal of Uperf Latency (Geometric Mean of five different profiles as defined in Uperf section) in usec generated between two same shaped VMs in different Availability Domains of the same Cloud Region, Average of three runs.

Example C Score Definition (VM/BM Shape, Unix Operating System Version)

As described above. For example, in accordance with an embodiment, a C score can be determined as:

C Score=Geometric_Mean (A_FREQ_GHz, A_TURBO_GHz, A_vCPUs, A_MemGB, A_BWGbps, M_Stream_T, M_SPECCPU_T1, M_SPECCPU_T2, M_HPL_T, M_HPL_L, M_Unixbench_T, M_Uperf_T, M_Uperf_L, M_Uperf_T2, M_Uperf_L2, S_SPECCPU_T1, S_SPECCPU_T2, S_Unixbench_T, S_Stream_T)

Example C-S Score Definition (VM/BM Shape, Unix Operating System Version)

As described above. For example, in accordance with an embodiment, a C-S score can be determined as:

C-S Score=Geometric_Mean (A_FREQ_GHz, A_TURBO_GHz, S_SPECCPU_T1, S_SPECCPU_T2, S_Unixbench_T, S_Stream_T)

Example C-M Score Definition (VM/BM Shape, Unix Operating System Version)

As described above. For example, in accordance with an embodiment, a C-M score can be determined as:

C-M Score=Geometric_Mean (A_FREQ_GHz, A_TURBO_GHz, A_vCPUs, A_MemGB, A_BWGbps, M_Stream_T, M_SPECCPU_T1, M_SPECCPU_T2, M_HPL_T, M_HPL_L, M_Unixbench_T, M_Uperf_T, M_Uperf_L, M_Uperf_T2, M_Uperf_L2)

In accordance with an embodiment, a C score is the actual cloud score of a given configuration or shape run on a given operating system. With a three score system the other sub-scores (C-S Score and C-M Score) can be used to define, for the given configuration or shape run on a given operating system, a single-threaded score and multi-threaded score respectively.

Figure 8:
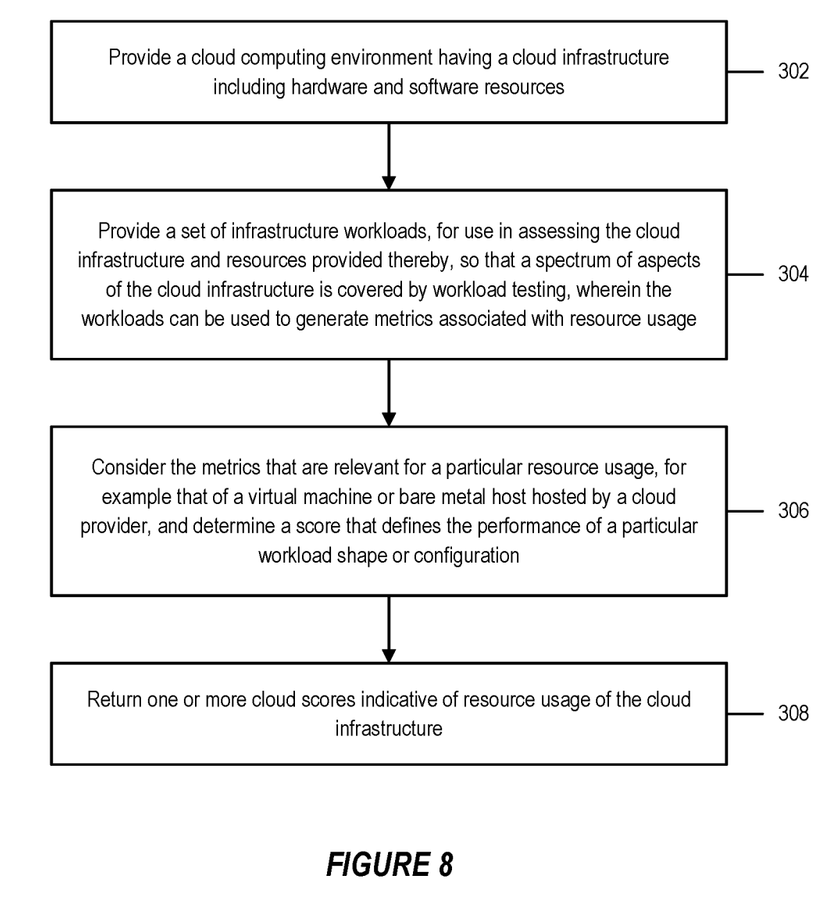
FIG. 8 illustrates a flowchart of a method for determining a cloud score associated with resource usage within a cloud environment, in accordance with an embodiment.

FIG. 8 illustrates a flowchart of a method for determining a cloud score associated with a resource configuration or shape within a cloud environment, in accordance with an embodiment.

As illustrated in FIG. 8, in accordance with an embodiment, at step 302, a cloud computing environment is provided, having a cloud infrastructure including hardware and software resources.

At step 304, a set of infrastructure workloads are provided, for use in assessing the cloud infrastructure and resources provided thereby, so that a spectrum of aspects of the cloud infrastructure is covered by workload testing, wherein the workloads can be used to generate metrics associated with resource usage.

At step 306, the process considers the metrics that are relevant for a particular resource usage, for example that of a virtual machine or bare metal host hosted by a cloud provider, and determine a score that defines the performance of a particular workload configuration.

At step 308, the process returns one or more cloud scores indicative of resource usage of the cloud infrastructure.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a cloud computing environment, for determining a cloud score associated with resource usage, comprising:
   a computer including one or more processors, and a cloud computing environment operating thereon and having a cloud infrastructure including hardware and software resources, wherein the cloud computing environment includes:
      a compute resources layer comprising a plurality of virtual machine or compute instances that can be provisioned and deployed within the cloud computing environment to run applications thereon, and
      a provisioning service that operates to provision and manage the virtual machine or compute instances as hosts to meet application requirements;
   wherein the system is operable to receive an indication of resource configuration or shape that includes a definition of a number of processing units and memory requirements associated with a virtual machine or compute instance;
   wherein the system comprises a plurality of workloads for assessing the cloud infrastructure and resources provided thereby, including wherein the workloads, when executed by the system, generate metrics that are indicative of performance of the resource configurations or shapes comprising one or more virtual machine or compute instances, including for each resource configuration or shape:
      spawning virtual machines or compute instances as defined by the resource configuration or shape;
      running a set of workloads such that each different workload within the set tests a different performance characteristic of the resource configuration or shape; and
      combining results from running the different workloads to generate an aggregate score spanning the results from those workloads for the resource configuration or shape;
   wherein the metrics that are associated with performance of a particular resource configuration or shape are aggregated over several runs of the workloads, and are used to determine, over a period of time as the virtual machines or compute instances continue to operate within the cloud infrastructure and use the resources provided thereby, a score and trend data associated therewith that defines performance of a particular workload for the particular resource configuration or shape, including aggregating information from the several runs of workloads across the virtual machines or compute instances provisioned within the cloud computing environment, generating a score associated therewith, modifying the configuration or shape, and calculating the score again, in determining the trend data associated therewith that defines performance of the particular workload for the particular resource configuration or shape; and
   wherein the system returns the score as an indication of one or more cloud scores indicative of the resource usage of the cloud infrastructure.

2. The system of claim 1, wherein the system comprises a workload processor receives an indication of a particular configuration of resources for workload testing, including a number of bare metal instances or virtual machines, with various performance characteristics that define a cloud infrastructure configuration.

3. The system of claim 1, wherein the one or more cloud scores includes an overview score over all types of workloads; a single-threaded workload component; and a multi-threaded workload component.

4. The system of claim 1, wherein for each of various networks, configurations, or shapes, the system runs a plurality of different types of workloads, each associated with metrics provided by those workloads.

5. The system of claim 1, wherein the system can generate a performance alert based on a gain or drop in the workload runs.

6. The system of claim 1, wherein the system operates in combination with a workload processor operating within the cloud environment, to generate a cloud score.

7. The system of claim 1, wherein a resource configuration or shape defines an amount of processor cores, memory, and network requirements associated with each virtual machine or compute instance provisioned within the cloud computing environment and against which the set of workloads are run.

8. A method for use with a cloud computing environment, for determining a cloud score associated with resource usage, comprising:
providing, at a computer including one or more processors, a cloud computing environment operating thereon and having a cloud infrastructure including hardware and software resources, wherein the cloud computing environment includes:
a compute resources layer comprising a plurality of virtual machine or compute instances that can be provisioned and deployed within the cloud computing environment to run applications thereon, and
a provisioning service that operates to provision and manage the virtual machine or compute instances as hosts to meet application requirements;
receiving an indication of resource configuration or shape that includes a definition of a number of processing units and memory requirements associated with a virtual machine or compute instance;
providing a plurality of workloads for use in assessing the cloud infrastructure and resources provided thereby, including wherein the workloads, when executed, generate metrics that are indicative of performance of resource configurations or shapes comprising one or more virtual machine or compute instances, including for each resource configuration or shape:
spawning virtual machines or compute instances as defined by the resource configuration or shape;
running a set of workloads such that each different workload within the set tests a different performance characteristic of the resource configuration or shape; and
combining results from running the different workloads to generate an aggregate score spanning the results from those workloads for the resource configuration or shape;
determining, based on the metrics associated with performance of a particular resource configuration or shape, aggregated over several runs of the workloads and over a period of time as the virtual machines or compute instances continue to operate within the cloud infrastructure and use the resources provided thereby, a score and trend data associated therewith that defines performance of a particular workload for the particular resource configuration or shape, including aggregating information from the several runs of workloads across the virtual machines or compute instances provisioned within the cloud computing environment, generating a score associated therewith, modifying the configuration or shape, and calculating the score again, in determining the trend data associated therewith that defines performance of the particular workload for the particular resource configuration or shape; and
returning the score as an indication of one or more cloud scores indicative of the resource usage of the cloud infrastructure.

9. The method of claim 8, wherein the method comprises that a workload processor receives an indication of a particular configuration of resources for workload testing, including a number of bare metal instances or virtual machines, with various performance characteristics that define a cloud infrastructure configuration.

10. The method of claim 8, wherein the one or more cloud scores includes an overview score over all types of workloads; a single-threaded workload component; and a multi-threaded workload component.

11. The method of claim 8, wherein for each of various networks, configurations, or shapes, the system runs a plurality of different types of workloads, each associated with metrics provided by those workloads.

12. The method of claim 8, wherein the system can generate a performance alert based on a gain or drop in the workload runs.

13. The method of claim 8, further comprising operating in combination with a workload processor operating within the cloud environment, to generate a cloud score.

14. A non-transitory computer readable storage medium having instructions thereon, which when read and executed by a computer including one or more processors cause the computer to perform a method comprising:
providing, at a computer including one or more processors, a cloud computing environment operating thereon and having a cloud infrastructure including hardware and software resources, wherein the cloud computing environment includes:
a compute resources layer comprising a plurality of virtual machine or compute instances that can be provisioned and deployed within the cloud computing environment to run applications thereon, and
a provisioning service that operates to provision and manage the virtual machine or compute instances as hosts to meet application requirements;
receiving an indication of resource configuration or shape that includes a definition of a number of processing units and memory requirements associated with a virtual machine or compute instance;
providing a plurality of workloads for use in assessing the cloud infrastructure and resources provided thereby, including wherein the workloads, when executed, generate metrics that are indicative of performance of resource configurations or shapes comprising one or more virtual machine or compute instances, including for each resource configuration or shape:
spawning virtual machines or compute instances as defined by the resource configuration or shape;
running a set of workloads such that each different workload within the set tests a different performance characteristic of the resource configuration or shape; and
combining results from running the different workloads to generate an aggregate score spanning the results from those workloads for the resource configuration or shape;
determining, based on the metrics associated with performance of a particular resource configuration or shape, aggregated over several runs of the workloads and over a period of time as the virtual machines or compute instances continue to operate within the cloud infrastructure and use the resources provided thereby, a score and trend data associated therewith that defines performance of a particular workload for the particular resource configuration or shape, including aggregating information from the several runs of workloads across the virtual machines or compute instances provisioned within the cloud computing environment, generating a score associated therewith, modifying the configuration or shape, and calculating the score again, in determining the trend data associated therewith that defines performance of the particular workload for the particular resource configuration or shape; and returning the score as an indication of one or more cloud scores indicative of the resource usage of the cloud infrastructure.

15. The non-transitory computer readable storage medium of claim 14, wherein the method comprises that a workload processor receives an indication of a particular configuration of resources for workload testing, including a number of bare metal instances or virtual machines, with various performance characteristics that define a cloud infrastructure configuration.

16. The non-transitory computer readable storage medium of claim 14, wherein the one or more cloud scores includes an overview score over all types of workloads; a single-threaded workload component; and a multi-threaded workload component.

17. The non-transitory computer readable storage medium of claim 14, wherein for each of various networks, configurations, or shapes, the system runs a plurality of different types of workloads, each associated with metrics provided by those workloads.

18. The non-transitory computer readable storage medium of claim 14, wherein the system can generate a performance alert based on a gain or drop in the workload runs.

19. The non-transitory computer readable storage medium of claim 14, further comprising operating in combination with a workload processor operating within the cloud environment, to generate a cloud score.

\* \* \* \* \*